United States Patent
Padmarao et al.

(10) Patent No.: US 12,301,011 B2
(45) Date of Patent: May 13, 2025

(54) METHOD FOR CONTROLLING A HYBRID POWER GENERATION PLANT BY VARYING POWER PRODUCTION OF ONE OF A PLURALITY OF POWER SOURCES BASED ON DATA FROM THE GRID AND CHARACTERISTICS OF EACH POWER SOURCE

(71) Applicant: GE Renewable Technologies, Grenoble (FR)

(72) Inventors: Veena Padmarao, Bangalore (IN); Raganathan Radhakrishnan Nair, Vadoddara (IN); Arvind Kumar Tiwari, Niskayuna, NY (US); Santhosh Kumar C, Chennai (IN); José Luis Ferral, Vaulnaveys le Haut (FR)

(73) Assignee: GE Renewable Technologies, Grenoble (FR)

( * ) Notice: Subject to any disclaimer, the term of this patent is extended or adjusted under 35 U.S.C. 154(b) by 354 days.

(21) Appl. No.: 17/691,545

(22) Filed: Mar. 10, 2022

(65) Prior Publication Data
US 2022/0294231 A1    Sep. 15, 2022

(30) Foreign Application Priority Data

Mar. 12, 2021 (EP) .................... 21305313

(51) Int. Cl.
  *H02J 3/46* (2006.01)
  *G05B 15/02* (2006.01)
  *H02J 3/32* (2006.01)

(52) U.S. Cl.
  CPC ............. *H02J 3/466* (2020.01); *G05B 15/02* (2013.01); *H02J 3/32* (2013.01); *H02J 2300/20* (2020.01);
  (Continued)

(58) Field of Classification Search
  CPC .......... H02J 3/466; H02J 3/32; H02J 2300/20; H02J 2300/24; H02J 2300/28; H02J 3/48;
  (Continued)

(56) References Cited

U.S. PATENT DOCUMENTS 5,225,712 A   7/1993   Erdman
8,260,469 B2  9/2012   Gregory et al.
(Continued)

FOREIGN PATENT DOCUMENTS

CN   105186969 B   4/2017
CN   110336335 A   10/2019
(Continued)

OTHER PUBLICATIONS

European Search Report Corresponding to EP21305313 on Aug. 16, 2021.
(Continued)

*Primary Examiner* — Darrin D Dunn
*Assistant Examiner* — Marzia T Monty
(74) *Attorney, Agent, or Firm* — Dority & Manning, P.A.

(57) ABSTRACT

A method and system for controlling a hybrid power generation plant by receiving from a grid a data from among a power demand, a peak hour, a frequency, a ramp, a reactive power, or a voltage. A power production of power sources in the plant is varied depending on the received data and a characteristic of each of the power sources. The varying increases an active power produced by the plant while maintaining reactive power at a constant level by increasing a real power of a first power source while decreasing a reactive power produced by the first power source and simultaneously increasing a reactive power produced by a second power source without increasing a real power pro-
(Continued)

duced by the second power source. The first power source is a different type of power source from the second power source.

13 Claims, 7 Drawing Sheets

(52) U.S. Cl.
CPC ....... *H02J 2300/24* (2020.01); *H02J 2300/28* (2020.01)

(58) Field of Classification Search
CPC .......... H02J 3/50; H02J 2300/40; H02J 3/381; H02J 3/46; G05B 15/02
See application file for complete search history.

(56) References Cited

U.S. PATENT DOCUMENTS

| | | | |
|---|---|---|---|
| 9,325,173 | B2 | 4/2016 | Varma et al. |
| 9,438,041 | B2 | 9/2016 | Roy et al. |
| 9,887,545 | B2 | 2/2018 | Bamberger et al. |
| 10,060,296 | B2 | 8/2018 | Friesth |
| 10,185,346 | B2 | 1/2019 | Matan et al. |
| 10,280,893 | B2 | 5/2019 | Jessamy |
| 10,344,741 | B2 | 7/2019 | Sant et al. |
| 10,389,125 | B2 | 8/2019 | Wilkins et al. |
| 10,505,480 | B2 | 12/2019 | Gerwig et al. |
| 10,539,118 | B2 | 1/2020 | Jessen et al. |
| 10,554,049 | B2 | 2/2020 | Stewart et al. |
| 10,622,811 | B2 | 4/2020 | Jung et al. |
| 10,982,570 | B2 | 4/2021 | Conlon |
| 11,005,270 | B2 | 5/2021 | Falk et al. |
| 2010/0207453 | A1* | 8/2010 | Ottman .................. H02S 10/12 307/72 |
| 2011/0282500 | A1 | 11/2011 | Long et al. |
| 2012/0049636 | A1 | 3/2012 | Galbraith et al. |
| 2012/0144828 | A1 | 6/2012 | Lazaris |
| 2013/0293021 | A1 | 11/2013 | Varma et al. |
| 2014/0180489 | A1 | 6/2014 | Asghari et al. |
| 2016/0072299 | A1* | 3/2016 | Huang .................. B60L 50/16 307/104 |
| 2016/0308369 | A1* | 10/2016 | Gupta .................... H02K 7/183 |
| 2017/0204806 | A1 | 7/2017 | Friesth |
| 2017/0322580 | A1* | 11/2017 | Matan ...................... G05F 1/70 |
| 2018/0076622 | A1 | 3/2018 | Wilkins et al. |
| 2018/0100480 | A1 | 4/2018 | Duquette et al. |
| 2018/0152131 | A1 | 5/2018 | Vidhi et al. |
| 2018/0347406 | A1 | 12/2018 | Friesth |
| 2019/0036340 | A1 | 1/2019 | Meeker et al. |
| 2019/0203693 | A1* | 7/2019 | Tiwari ................... F03D 9/255 |
| 2019/0245353 | A1 | 8/2019 | Varma et al. |
| 2019/0280640 | A1 | 9/2019 | Ganireddy et al. |
| 2020/0028364 | A1 | 1/2020 | Rogers |
| 2020/0067312 | A1 | 2/2020 | Pavlovski et al. |
| 2021/0296898 | A1 | 9/2021 | Padmarao et al. |
| 2021/0404438 | A1* | 12/2021 | Nielsen ..................... F03D 5/00 |

FOREIGN PATENT DOCUMENTS

| | | |
|---|---|---|
| EP | 2955807 A1 | 12/2015 |
| EP | 3048687 A1 | 7/2016 |
| EP | 3371421 A1 | 9/2018 |
| EP | 3422523 A1 | 1/2019 |
| EP | 3203596 B1 | 3/2019 |
| FR | 3112038 A1 | 12/2021 |
| WO | WO2012053988 A2 | 4/2012 |
| WO | WO2016187659 A1 | 12/2016 |
| WO | WO2018006920 A1 | 1/2018 |
| WO | WO2019001986 A1 | 1/2019 |
| WO | WO2019054907 A1 | 3/2019 |
| WO | WO2020007702 A1 | 1/2020 |

OTHER PUBLICATIONS

Ellis et al., Reactive Power Performance Requirements for Wind and Solar Plants, IEEE Power and Energy Society General Meeting, San Diego, CA, 2012, pp. 1-8.

Sarkar et al., Reactive Power Management in Renewable Rich Power Grids: A Review of Grid-Codes, Renewable Generators, Support Devices, Control Strategies and Optimization Algorithms, IEEE Access, vol. 6, 2018, pp. 41458-41489.

Varma et al., Novel Nighttime Application of PV Solar Farms as STATCOM (PV-STATCOM), IEEE Power and Energy Society General Meeting, Jul. 2012, pp. 1-8. (Abstract Only).

* cited by examiner

METHOD FOR CONTROLLING A HYBRID POWER GENERATION PLANT BY VARYING POWER PRODUCTION OF ONE OF A PLURALITY OF POWER SOURCES BASED ON DATA FROM THE GRID AND CHARACTERISTICS OF EACH POWER SOURCE

TECHNICAL FIELD AND PRIOR ART

The invention concerns hybrid power plants, for example a hydro-solar-battery hybrid system which comprises different types of power sources, for example solar photovoltaic (PV) modules, batteries storage devices and one or more hydraulic generators.

Figure 1:
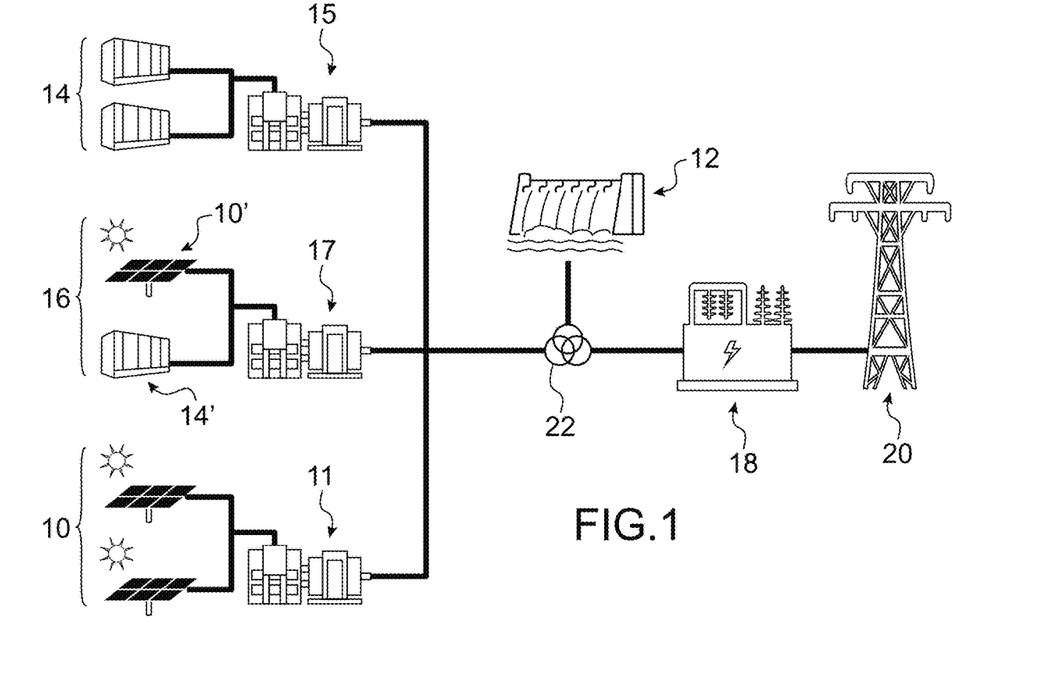
FIG. 1 shows an example of a known hybrid plant.

The general structure of such a plant is illustrated on FIG. 1; it comprises generating assets, for example:
- one or more solar panel(s) 10 and solar inverter(s) 11,
- one or more hydro generator(s) 12,
- and/or one or more battery energy storage system(s) 14 (BESS) and BESS inverter(s) 15,
- and/or one or more mixed system(s) 16, each comprising one or more solar panel(s) 10' and one or more BESS 14' together with one or more DC coupled inverter(s) 17 (or one or more common inverter shared by solar panel(s) and BESS).

The various assets are connected to a transformer, usually a 3 windings transformer 22, the hydro generator being connected to one winding of said transformer and the other assets being connected to a second winding.

The system further comprises a substation transformer 18 connecting the hybrid plant to an electrical network 20 at the grid interface.

Figure 2:
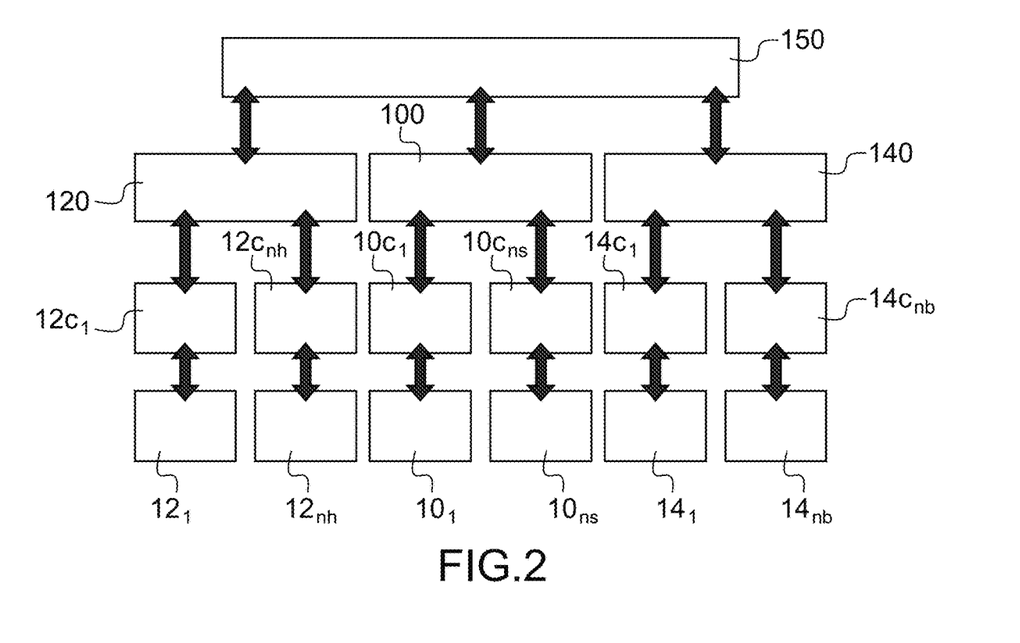
FIG. 2 shows an example of a system architecture for managing a known hybrid plant.

The existing system architecture for managing such a plant is schematically illustrated on FIG. 2 for a plant comprising $n_h$ hydro generator(s) $12_1$-$12_{nh}$, $n_s$ solar panel(s) $10_1$-$10_{ns}$ and n BESS $14_1$-$14_{nb}$. Each individual generator or panel or BESS is controlled by an individual control unit $12c_1$-$12c_{nh}$, $10c_1$-$10c_{ns}$ and $14c_1$-$14c_{nb}$, which are themselves connected to a respective hydro plant control system 120, a solar plant control system 100 and a BESS plant control system 140. A grid interface 150 sends instructions or data and receives data to or from the different control systems 100, 120, 140.

The existing system has no coordinating function of the different assets or may require manual intervention of an operator to achieve a coordinated operation, in particular if the grid requires more or less power in different situations, like during peak hours.

There is therefore a need for a new system and a new method to control the different power sources of a hybrid power plant, in particular in situations where grid power must be increased or decreased in reaction to a new situation on the grid's side, for example a frequency variation or a variation in the power demand.

SUMMARY OF THE INVENTION

The invention first concerns a method for controlling a hybrid power generation plant comprising a plurality of different power sources among a hydro plant or generator, a solar plant, at least one wind turbine and a battery storage system.

The plant may comprise, for example:
- a hydro plant, comprising at least one hydro unit and one or more intermittent source(s) like a solar plant, and/or at least one wind turbine and/or a battery storage system;
- or several intermittent source(s) like a solar plant, and/or at least one wind turbine and/or a battery storage system. Said method can comprise:
- receiving from a grid to which the hybrid power generation plant is connected at least one data among a power price, a power demand, a peak hour, a frequency, a ramp, a reactive power, a voltage;
- and/or varying a power production of at least one of the plurality of power sources (for example as a function of time and/or according to predetermined criteria, for example a ramp of a fast load change), depending on said at least one data received from the grid and at least one characteristic, for example:
- the capacities and/or the capabilities of power production of each of said plurality of power sources;
- and/or the power range that each of them can produce;
- and/or the power curves of at least one of said power sources, for example of a hydro generator and/or a solar inverter, said power curves giving an output power as a function of the output voltage or an output voltage as a function of the efficiency of production or an output power as a function of the efficiency or real power and reactive power of apparent power capability curves;
- and/or one or more parameter(s) among a solar irradiation (for solar plants), a wind speed and/or turbulence (for wind plant(s)), battery/batteries state(s) of charge (for BESS), a water reservoir(s) level and/or a water flow (for hydro generator(s)), and/or air density (used for example for wind power calculation) and/or a grid voltage and/or a power factor (ratio of real power (or active power) to apparent power).

Varying a power production of at least one of the plurality of power sources (for example as a function of time and/or according to predetermined criteria, for example a ramp of a fast load change), may contribute to avoiding tear and wear, in particular of the hydro generator(s).

For example, said method comprises:
- increasing, resp. decreasing, the power produced by said hydro plant so as to increase its efficiency and reducing, resp. increasing, the power produced by at least one of said intermittent source(s), for example said solar plant and/or said battery storage system;
- and/or decreasing the reactive power produced by at least one of said plurality of power sources and increasing the reactive power produced by at least another one of said plurality of power sources, so that the active power produced by the hybrid plant is increased, while meeting the reactive power requirements of the grid; this expands the operating range of hybrid plant; for example, data of reactive power and active power of at least one of said plurality of power sources can be compared with data of apparent power capability curves of said at least one power source;
- and/or detecting a frequency variation from an initial frequency of the grid and varying (decreasing or increasing) the power output of at least one of said plurality of power sources to restore the initial frequency; for example, the power output of both the battery supply system and the hydro plant can be varied;
- and/or producing power by at least a first power source and a second power source of said power sources to meet a first power requirement from the grid during a first time slot, for example during daylight, thus saving power from said first power source and producing power by only said first power source to meet a second power requirement from the grid during a second time slot, for example during the night; for example it can comprise producing power with the hydro plant and at least the solar plant and/or the battery storage system during said first time slot and producing power with only said hydro plant or a combination of said hydro plant and said battery storage system during said second time slot;

and/or producing power by at least one of said power sources to meet at least one of a ramp rate requirement from the grid, or a peak hour power demand from the grid, or a load demand from the grid in real time or a reactive power requirement or a power factor grid requirement or a voltage requirement from the grid or a frequency response.

A method according to the invention may further comprise:

producing at least one data about a power or a power generated by at least one of said plurality of power sources (which generated power is time varying) or a power demand or an energy price forecast;

and/or providing at least one grid interface with an updated power schedule and/or at least one forecast application with at least an actual power data.

The invention also concerns a system for controlling a hybrid power generation plant comprising a plurality of different power sources, among a hydro plant, a solar plant at least one wind turbine and a battery storage system, said system comprising means programmed to implement a method according to the invention.

According to another aspect of the invention, the power-efficiency curve of a hydro unit can include a forbidden zone in which instability can occur. A method according to the invention, in particular as described above or in this application, may allow an adaptation of the hydro plant output power level so that it is outside the forbidden zone. In other words:

the power produced by the hydro unit can be reduced or increased so that it operates outside said forbidden zone;

and the power produced by the solar plant and/or the BESS and/or the wind plant is varied, for example correspondingly varied; for example it is increased (in particular if the power produced by the hydro unit is reduced) or reduced (in particular if the power produced by the hydro unit is increased), so that the whole power produced by the hybrid plant can have the expected level, for example so that said whole power can stay constant or, more generally, correspond to the requirement of the grid.

The invention also concerns a system for controlling a hybrid power generation plant comprising a plurality of different power sources, among a hydro plant, a solar plant, at least one wind turbine and a battery storage system, said system comprising:

means for receiving at least one data among a power price, a power demand, a peak hour, a frequency, a ramp, a reactive power, a voltage from a grid;

means, or means specially programmed, for varying a power production of at least one of the plurality of power sources depending on said at least one data received from the grid and at least one characteristic of each of said plurality of power sources.

In a system according to the invention, said means for varying a power production of at least one of the plurality of power sources may comprise at least one of the following modules:

a grid performance based control module;
a coordinated control module;
an optimized control module.

The invention also concerns a hybrid power generation plant comprising a plurality of power sources, among a hydro plant, a solar plant and a battery storage system, at least one wind turbine and a system for controlling said hybrid power generation plant according to the invention.

BRIEF DESCRIPTION OF THE DRAWINGS

FIGS. 12A-14D show examples of grid disturbances causing a drop in frequency, and different possible responses of the system, with only the hydraulic plant (FIGS. 12A-12D), with only the battery plant (FIG. 13A-13D), and with a coordinated response of both the battery plant and the hydraulic plant (FIG. 14A-14D).

DETAILED DESCRIPTION OF SPECIFIC EMBODIMENTS

Figure 3:
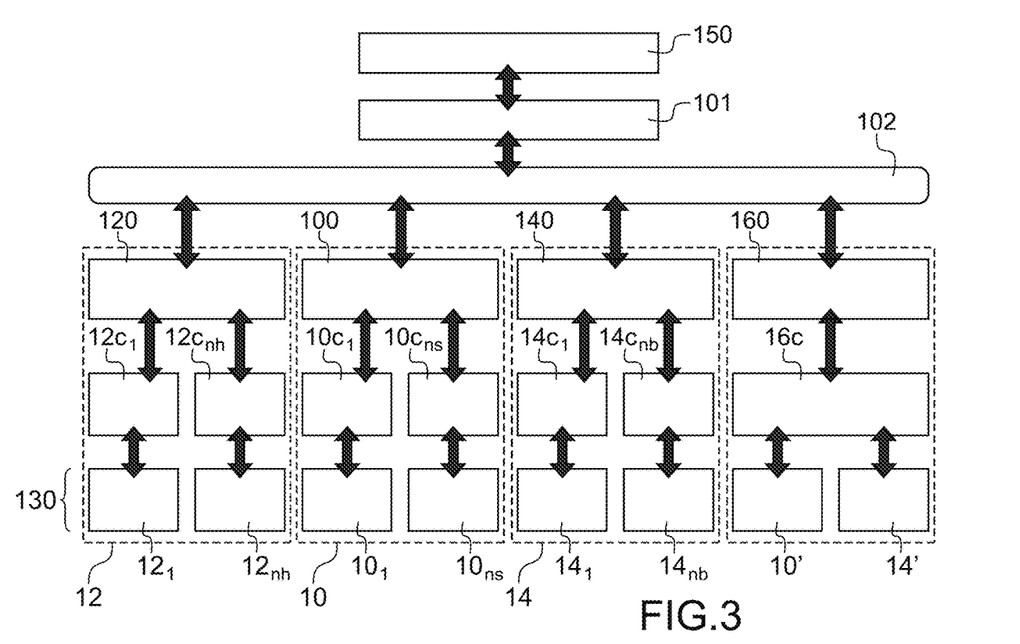
FIG. 3 is an example of a mixed plant control system according to the invention for managing a hybrid plant.

An example of a hybrid system architecture according to the invention is illustrated on FIG. 3.

The system of this example comprises:

a solar plant 10, comprising $n_s$ solar panel(s) $10_1$-$10_{ns}$ and $n_s$ solar inverter(s) $10c_1$-$10c_{ns}$, all of them being controlled by a solar plant control unit 100;

a hydro plant 12, comprising $n_h$ hydro generator(s) $12_1$-$12_{nh}$ and $n_h$ hydro control unit(s) $12c_1$-$12c_{nh}$ all of them being controlled by a hydro plant control unit 120;

a BESS plant 14, comprising $n_b$ battery energy storage system(s) BESS $14_1$-$14_{nb}$ and BESS inverter(s) and their control unit(s) $14c_1$-$14c_{nb}$, all of them being controlled by a BESS plant control unit 140;

a mixed plant 16, comprising one or more solar panel(s) 10' and one or more BESS 14' together with one or more DC coupled inverter control unit(s) 16c (or one or more common inverter shared by solar panel(s) and BESS), said inverter being controlled by a mixed control unit 160.

Thus system can also comprise a wind plant comprising $n_w$ wind turbines (not represented on the figures) all of them being controlled by a wind plant control unit. Each wind turbine is associated with a corresponding inverter or converter, which can be located in the wind turbine itself.

A "hydro unit" is a hydroelectric machine comprising a turbine and a generator. A "hydro plant" includes a dam and one or several hydroelectric units. A generator of a hydro unit comprises the electrical part of the hydroelectric machine converting mechanical energy from the hydro turbine to electrical energy allowing energy transportation through the transmission lines of a grid.

Other examples of a system implemented in the frame of the invention can for example comprise:
- a hydro plant 12 and a solar plant 10 (but no BESS plant 14, no mixed plant and no wind plant);
- or a hydro plant 12 and a BESS plant 14 (but no solar plant, no mixed plant and no wind plant);
- or a hydro plant 12 and a wind plant (but no BESS plant, no mixed plant and no solar plant);
- or a solar plant 10 and a BESS plant 14 and/or a wind plant, but no hydro plant 12.

Whatever the plants, all of them can be connected to a same substation transformer 18 (see above description in connection with FIG. 1). In addition, depending on size and/or rating of said transformer, all plants may be connected via a single transformer or multiple transformers to said substation 18.

The $n_s$ solar panel(s) $10_1$-$10_{ns}$ (and inverter(s) not illustrated on the figures), and/or $n_h$ hydro generator(s) $12_1$-$12_{nh}$, and/or $n_b$ battery energy storage system(s) BESS $14_1$-$14_{nb}$ (and inverter(s) not illustrated on the figures) and/or wind turbine(s) and/or one or more solar panel(s) 10' (and inverter(s) not illustrated on the figures) and one or more BESS 14' (and inverter(s) not illustrated on the figures) form a power generation asset layer 130.

The different control units 100, 120, 140, 160 (and also the possible wind plant control unit) form the generation asset control layer and exchange data with a data and control interface 102, which exchanges data with an integrated plant control unit 101 which itself communicates with the grid interface 150 and possibly with a forecast module 114.

This architecture, and in particular the integrated plant control unit 101, allows an automated coordination and/or synergies between the different power sources; in particular a common electrical balance of the whole plant can be achieved, based on the knowledge of capabilities of all power sources to meet one or more common goal(s), thereby improving the hybrid plant performance compared to plants like the one illustrated on FIG. 1 or 2.

Figure 4:
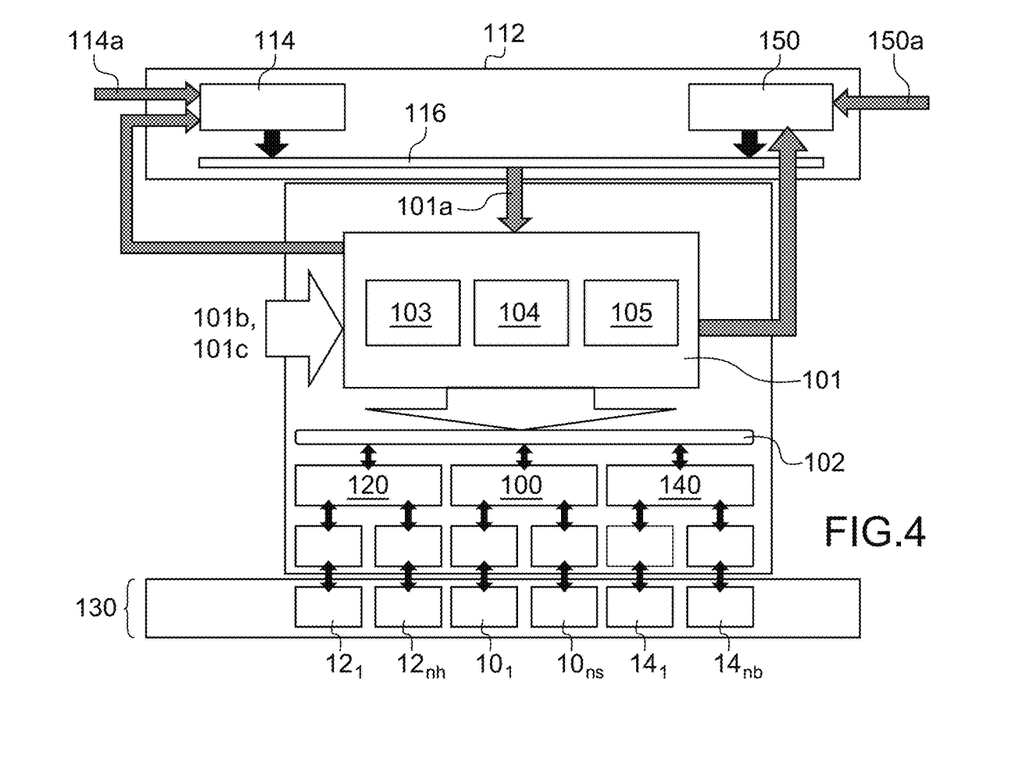
FIG. 4 is illustrates a detailed embodiment of a mixed plant control system according to the invention.

As illustrated on FIG. 4, the grid interface 150 may form part of a system 112 like a SCADA (Supervisory Control And Data Acquisition) or a server or a control system.

Said grid interface 150 receives data 150a from the grid and/or measures grid data, preferably real time data, for example:
- energy price data;
- and/or electrical demand and/or peak hours data;
- and/or data about the network frequency/frequencies;
- and/or data about frequency/frequencies requirements and/or ramp requirements;
- and/or grid voltage data.

Said data can be transferred, for example at specified time intervals, to the integrated plant control system or unit 101 via communication or connection means 116, for example a data highway.

In an embodiment, the system 112 may also comprise a module 114 implementing a forecast application, based on data 114a, preferably historical data and/or data about past time periods, for example:
- Energy price data;
- and/or energy or power demand data;
- and/or solar irradiation data;
- and/or global forecast data.

Based on said data, said forecast application module 114 may generate Day-Ahead and/or Intra-Day forecast data of power generation, and/or power price data, and/or peak hour(s) data, and/or demand data etc.

Preferably said forecast application module 114 is also connected to the same communication or connection means 116 as the grid interface 150.

Said communication or connection means 116, for example said data highway, transmit or forward data to the integrated plant control system 101; said integrated plant control system 101 comprises control means, for example a controller, which, based in particular on one or more of the above-mentioned information forwarded by said communication or connection means 116, control the different power sources or assets of the system. Said controller comprises for example at least one processor or microprocessor programmed to implement a control method according to the invention.

The integrated plant control system 101 receives for example:
- network information 101a from the grid interface 150, for example one or more of the above mentioned data received or measured by said grid interface 150, for example at specified time intervals;
- and/or plant design information 101b from the plant layout and/or operational information 101c from individual hydro control unit(s) $12c_1$-$12c_{nh}$, and/or solar control unit(s) $10c_1$-$10c_{ns}$, and/or wind control unit(s) and/or BESS control unit(s) $14c_1$-$14c_{ns}$, and/or DC coupled unit control unit(s). Each of said control unit can be for example a processor or microprocessor, programmed according to the operational needs or requirements.

In other words, the plant control system 101 can receive information from within the plant as well as from outside the plant:
- from outside the plant: for example information on the requirements of the electrical network is obtained through the grid interface 150;
- from within the plant: information from the individual controls units of the different assets of the power generation asset layer 130.

The hydro plant design information can for example comprise one or more of the following data:
- the type of hydro machine;
- the operating mode (hydraulic generator or pump storage operating mode);
- the generator minimum and maximum limits, and/or the pump minimum and maximum limits; These limits may change during the operation (for example the reservoir water limits will affect generator limits dynamically);
- cavitation and/or vibration zones (such zones are defined by design factors like the type and/or the mechanical and/or the hydraulic design of the hydro turbine and/or operational factors like water head and/or water flow and/or load);
- grid import hours.

The solar plant design information can for example comprise one or more of the following data:
- solar panel peak power (kW at peak);
- solar AC-DC ratio;
- inverter rating;
- solar over voltage and under voltage limits.

The battery systems design information can for example comprise one or more of the following data:
Battery power (kW);
Energy (kWh) rating;
Inverter rating.

The wind plant design information can for example comprise one or more of the following data:
wind information, for example wind speed and/or turbulence and/or shear etc.
air density;
rated power;
rated speed.
cut-in speed and/or cut-out speed.

Example of operational information 101c are one or more of the following data:
for the hydro plant: reservoir water limits (minimum and maximum) and/or gate opening limit of the hydraulic generator(s) and/or water head or level in the associated reservoir(s) and/or water flow;
and/or for the solar plant: irradiation;
and/or for the BESS: limits on battery state of charge and/or temperature limits and/or battery health status;
and/or for the wind plant: wind speed and/or turbulence (s);
and/or for all power sources: the point of interconnection limit (POI); said POI is the maximum power evacuation capacity as determined by the transmission system (which is part of the grid and beyond the grid interface 150) point of interconnection with the grid network and possibly approved by the system operator for the plant.

The plant control system 101 may also receive forecast data, for example from said forecast application module 114, about price forecast, and/or power generation, and/or peak hour, and/or demand etc.

Such data can be stored in a memory, for example of the integrated plant control means or system 101 and/or can be provided by the different individual control means to said integrated plant control means or system 101. Based on such data, said means or system 101 can perform one or more of the methods according to the invention.

Said plant control means or system 101 may for example generate:
set-points which are sent to the different asset control units, for example through a data and control interface 102;
and/or updated power schedule(s) which can be sent to the grid Interface 150.

Figure 5:
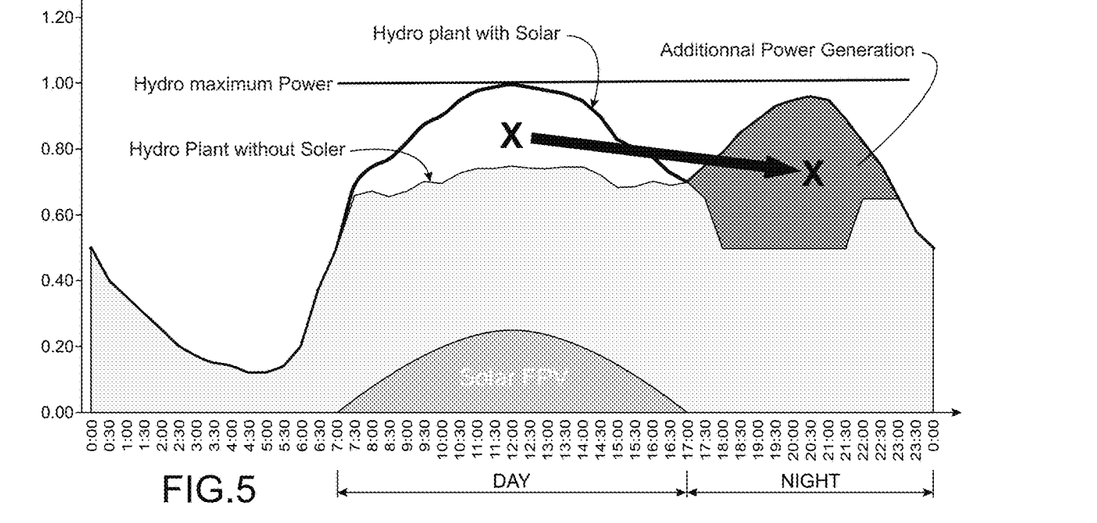
FIG. 5 is an example of energy shifting with a hybrid plant.
Figure 10:
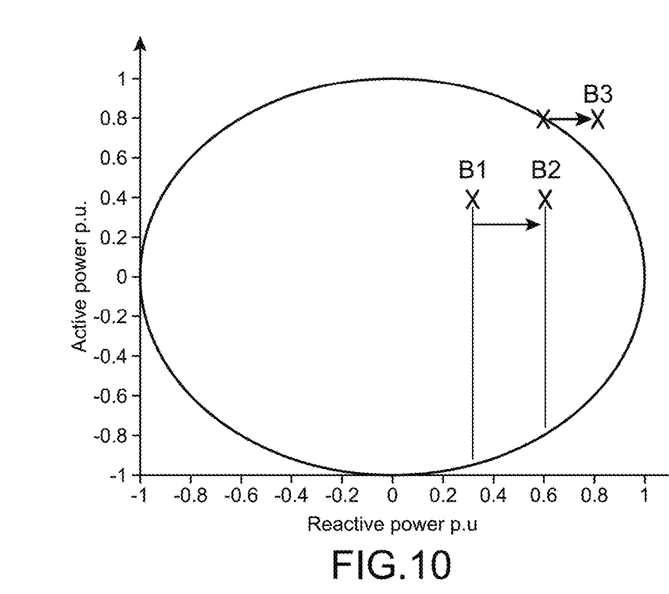
FIG. 10 is a solar inverter apparent power capability curve.
Figure 11:
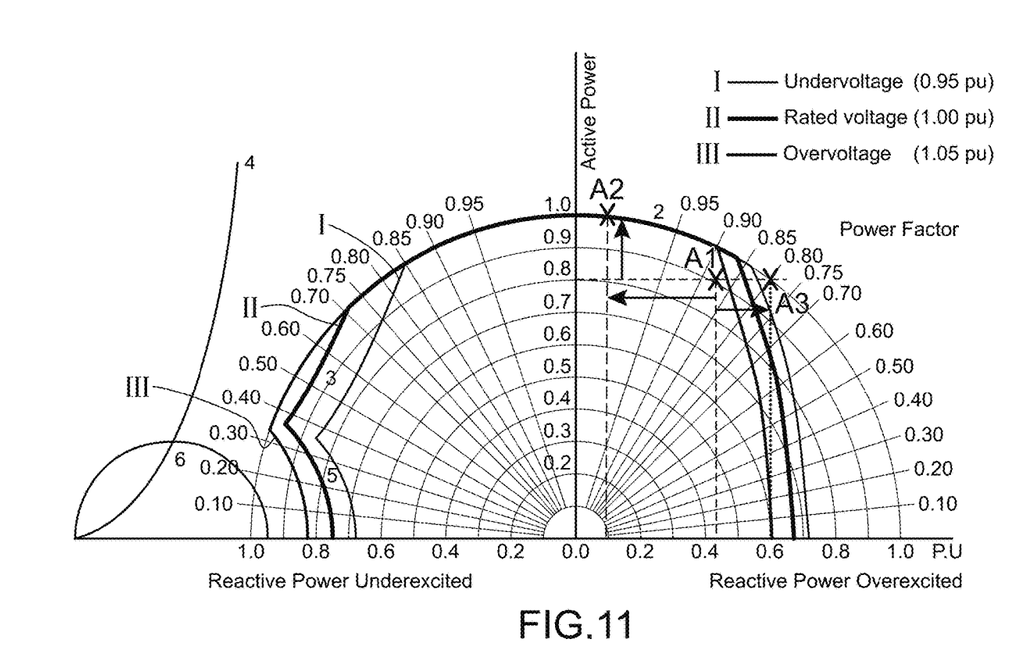
FIG. 11 is a hydraulic generator apparent power capability curve.

For example said integrated plant control means or system 101 may generate the set-point of the different assets of the power generation asset layer 130:
a) based on individual capability of the generation assets to meet grid mandated performance requirements at point of interconnect; for example, it determines said set points to meet the frequency of the grid and/or for a hybrid plant ramping adapted to demand from the grid; examples of coordinated controls of the grid performance are for example:
a1) to adapt the frequency response, in order to enable the hybrid plant to respond to changes in grid frequency by decreasing generation for over-frequency conditions and increasing generation for under-frequency conditions (examples of such a method are given below, in connection with FIGS. 12A-14D);
a2) or to adapt the ramp response, in order to enable the hybrid plant to meet ramp rate requirements from the grid operator;
a3) or to adapt the reactive power, in order to determine the hybrid plant reactive power generating set points for the different assets that will enable to meet the reactive power requirements of the grid; with intermittent sources like solar plants and/or wind turbines, this contributes to improving the required voltage stability to the grid; indeed, as explained below in connection with FIGS. 10 and 11, for maintaining the voltage stability of the grid, for a given amount of real power (kW) injected into the grid, a corresponding amount of reactive power (kVAr) can be injected into/absorbed from the grid as per grid requirement: for example, if the grid requires a constant power factor operation, then an increase in real power can be accompanied by an increase in reactive power such that the power factor is maintained constant;
b) and/or by leveraging hybrid synergies through coordinated control to achieve improved performance for applications like hydro reservoir water management through coordinated control of hydro, solar and battery systems (in a hybrid plant comprising said different systems); examples of coordinated controls are for example:
b1) to shift energy from one time or one time slot, when it is available, to another time or another time slot (when it is needed by the grid); for example, for a system according to the invention comprising at least a solar plant and a hydro plant, FIG. 5 shows solar power generated during the day: a water volume is thus saved during the day and remains in the reservoir; during the night, hydro power is generated with help of the saved water, when solar is not active anymore; thus, additional power generation is shifted to a more suitable time, increasing power delivered to the grid during 24 hours, without the water level being impacted, compared a pure hydro operation (where no water can be saved during the day). Alternatively, the system could comprise at least one wind turbine (wind being usually in excess during the night) and at least one hydro plant, the same, or a similar, energy shift being possible; for example, at night, energy based on the wind can be produced, the hydro plant being operated by the wind turbine(s) in pump mode and/or supplying the grid with power; during the day, the hydro plant and the wind turbine(s) can both supply power to the grid. In any of the above configurations (at least solar plant and hydro plant or at least wind turbine and hydro plant) one or more battery or BESS can be used to store power produced in excess; for example, if the power generated by the solar plant is such that, even though the hydro plant generation is lowered to its minimum, the total power production or generation exceeds the POI limit, excess power can be stored in one or more BESS during a first time slot, for example during the day, and power can be discharged from said one or more BESS during another time slot, for example during the night; alternatively, the solar plant and/or the at least one wind turbine can be used to produce energy or power which is stored in one or more BESS and possibly in said hydro plant (operated in pump storage mode). In any of the above described cases, the decision about the power or energy to be supplied to the grid and the power or quantity of energy which is to be stored in a BESS and/or a hydro plant at different times of the day can be taken by the hybrid plant control means or system 101;

b2) or to obtain a firm power output from the hybrid plant obtained by managing the different types of generation sources like hydro, solar, wind and battery;

b3) or to follow the load, that is to make the hybrid plant output follow a set-point received from the grid to meet load demand in real time.

c) and/or to meet optimization objectives, such as maximizing the net hybrid power production or maximizing the revenue generation of the hybrid plant and/or minimizing power losses in a hybrid plant; an optimization objective can be for example:

c1) generating more power at certain hour(s), for example peak hour(s), of the day, for example when the electricity tariff is high;

c2) and/or providing support in order to meet power demand from the grid at certain hour(s), for example at peak hour(s);

c3) maximizing the efficiency of the hybrid plant, based on the efficiency curves of one or more hydro unit(s) (see for example FIG. 7, 8, 9), and/or on the power curve of one or more solar inverter(s) (see for example FIG. 6), possibly with constraints of vibration zones and cavitation zones (or forbidden zones) of hydro units, and/or battery state of charge (SOC, comprised between 0% and 100%), and/or solar irradiation (solar production cannot exceed possible solar power which is based on irradiation) and/or generation by wind turbine (s) (generation of power by wind turbine(s) is less than or equal to possible wind power which itself depends on wind speed).

In an embodiment, said integrated plant control system 101 can have one or several control layers or modules, which utilize the data from the individual hydro, solar, wind, battery controllers as well as the electrical network information from beyond the grid interface. Said control layer(s) or module(s) can run on a same processor or microprocessor or on several processors or microprocessors. In a particular embodiment, the integrated plant control system 101 and the hydro plant control unit 120 can be hosted in a same hardware controller: in particular, the control of the hydro plant and of the hybrid plant can both be processed on a single processor or microprocessor.

For example, as illustrated on FIG. 4, said one or more control modules can comprise one or more of the following modules:

a grid performance based control module 103, which may determine the set-points of the different assets of the power generation asset layer 130 as explained in § a) above;

and/or a coordinated control module 104, which may determine the set-points of the different assets of the power generation asset layer 130 as explained in § b) above;

and/or an optimized control module 105, which may determine the optimal set-points of the different assets of the power generation asset layer 130 as explained in § c) above.

The generation asset control layer comprises the different control units 100, 120, 140, 160, each of which can be implemented as a processor or microprocessor. The functionalities of hybrid integrated plant control unit 101 and of the hydro plant control unit 120 can be implemented in a single processor or microprocessor.

Each of said control units:

receives from the integrated plant control means or system 101 one or more set-point(s) for the corresponding asset(s), for example through a data and control interface 102;

and/or converts the generation set-points received to appropriate control signals, for example wicket gate opening(s) for hydro units, and/or voltage reference for solar unit(s) and/or current/voltage reference(s) for battery units;

and/or can send feedback data about a water level in a water reservoir, and/or a battery SOC (State of Charge), and/or a plant power to the integrated plant control unit 101 and/or in a power generation feedback to a possible forecast application 114.

The assets of the power generation asset layer 130 are actuated by the asset control units $12c_1$-$12c_{nh}$, $10c_1$-$10c_{ns}$, $14c_1$-$14c_{nb}$, $16c$ to generate power corresponding to the set-points determined by the integrated plant control system 101.

As explained above, the integrated plant control system 101 receives information from within the plant as well as from outside the plant:

from outside the plant: information on the requirements of the electrical network, for example obtained from the grid Interface;

from within the plant: information from the individual controls means of the different assets of the power generation asset layer 130.

Based on said information from the above two sources it determines or calculates the plant set-points to improve the plant performance for multiple applications. Examples of such applications were already described in § a)-c) above.

The below sections describe two other examples (d) and (e):

(d) to achieve better efficiency of hybrid plant;

and/or (e) to achieve better real power production from hybrid plant.

Such applications contribute to the improved hybrid plant performance.

A novel control method of a hybrid plant according to the invention is presented to increase hybrid plant efficiency by expanding the operating range. This novel method enables meeting the grid dispatch power set-point in a more efficient manner than according to the prior art.

Figure 6:
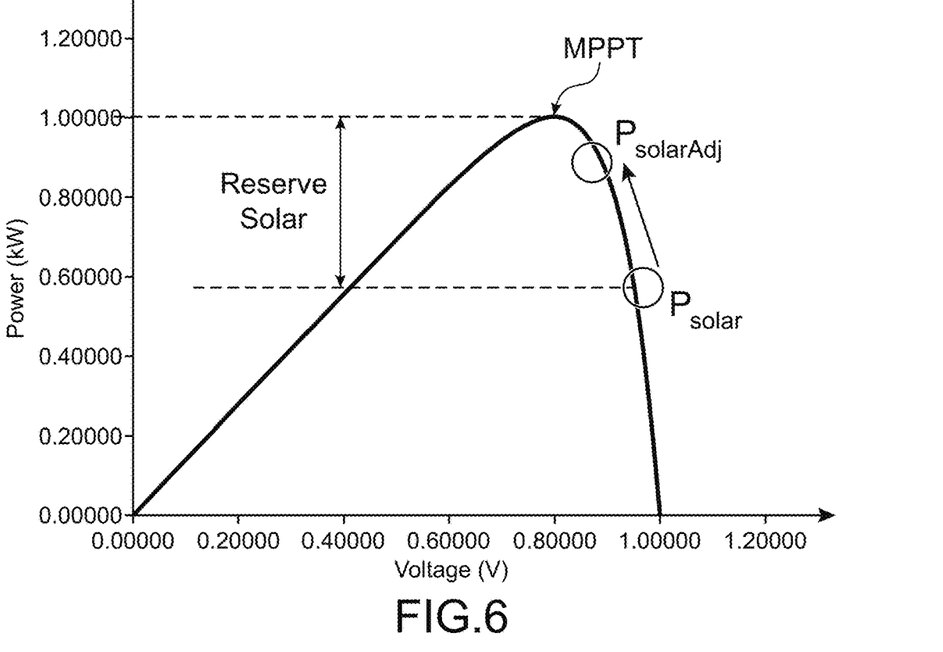
FIG. 6 is a solar power curve of a solar plant.

FIG. 6 represents a solar generation power curve, which gives the output power according to the voltage between the terminals of the solar inverter. The typical operating point for solar inverters is at Maximum Power Point. In the proposed method, the operating point for the solar assets ($P_{solar}$) is selected such that a certain amount of solar possible power is maintained as reserve (Reserve Solar).

Figure 7:
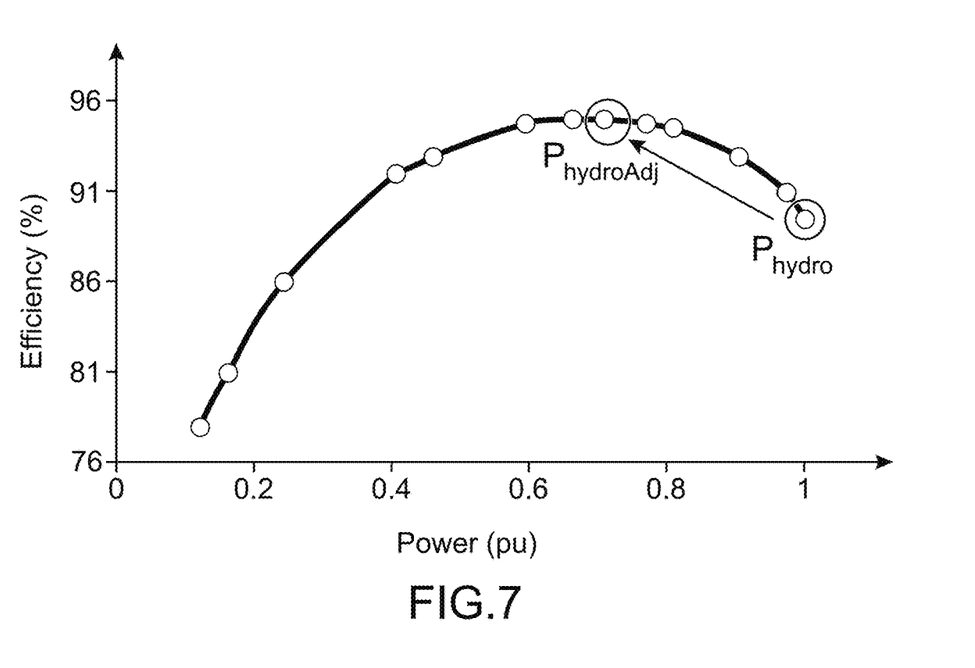
FIG. 7 is a efficiency curve of a hydro unit.

FIG. 7 shows the efficiency versus output power curve of a hydraulic unit, which gives its efficiency according to the output power of the hydro plant (at a particular head; with varying head, the shape of this efficiency curve changes). Under typical conditions, the operating point $P_{hydro}$ of the hydro plant is determined based on power requirement from the grid.

Curves like those illustrated on FIGS. 6 and 7, or data of points of said curves, or data representing at least part of these curves (for FIG. 7, it can be a plurality of efficiency versus output power curves, for various heads), are for example stored in a memory of the integrated plant control means or system 101; alternatively, the individual hydro controllers $12c_1$-$12c_{nh}$ and/or the solar plant individual controllers $10c_1$-$10c_{ns}$, can send the efficiency curves, or said data of such efficiency curves or representing at least part of them, for example (for solar controllers) the MPPT and/or the operating point and/or the reserve, to said integrated plant control means or system 101. In other examples, individual battery controllers $14c_1$-$14c_{nb}$ can send SOC and/or other information from respective battery assets, for example data of, or data representing, efficiency curve(s).

The output power of each asset of the layer 130, $P_{hydro}$, $P_{solar}$, $P_{battery}$ and $P_{wind}$, is preferably determined such that their sum meets the plant power requirement received through the grid interface 150 and forwarded to the hybrid integrated plant control means 101.

A proposed method according to the invention enables an improvement in an hybrid plant efficiency by changing the operating points of, for example, the solar and hydro plants to adjusted values $P_{hydroAdj}$ and $P_{solarAdj}$.

$P_{hydroAdj}$ is selected such that the efficiency of hydro plant at operating point $P_{hydroAdj}$ is greater than the efficiency at $P_{hydro}$.

In the below equations, the difference between $P_{hydro}$ and $P_{hydroAdj}$ is indicated as $\Delta P$ and is such that the efficiency of hydro plant increases. In other words, depending on the starting point $P_{hydro}$, the power produced by the hydro plant is reduced or increased, but its efficiency increases. $\Delta P$ may be positive or negative depending on the original and adjusted operating points of the hydro plant.

After $\Delta P$ is determined, an adjustment of the solar operating point is made by the control system 101 to move the output solar plant from $P_{solar}$ to $P_{solarAdj}$. For example, if the power produced by the hydro plant decreases, the power produced by the solar plant is correspondingly increased. This adjustment makes use of the reserve solar explained above (FIG. 6).

The equations for an adjusted plant operating point can be the following:

$$P_{plant}=P_{hydro}+P_{solar}+P_{battery}+P_{wind}$$

$$P_{hydroAdj}=P_{hydro}-\Delta P$$

$$P_{solarAdj}=P_{solar}+\Delta P$$

$$P_{plant}=P_{hydroAdj}+P_{solarAdj}+P_{battery}+P_{wind}$$

(These equations include the contributions from the BESS and the wind turbine(s) but the system may also not comprise such BESS and/or wind turbine(s)).

In a first step, an optimal $\Delta P$ is obtained by determining $\Delta P=P_{hydro}-P_{hydroAdj}$ based on the hydro plant efficiency curve, such that $\eta_{hydroAdj}>\eta_{hydro}$. $\Delta P$ will be compensated by a corresponding $P_{solaradj}$.

In a second step (this second step can take place at the same time as the first step of even just before) the "reserve solar" is calculated from solar irradiation data and from $P_{solar}$.

In a third step, if $\Delta P$ is positive, it is verified if $\Delta P$<Reserve Solar.

If $\Delta P$ is negative, the same approach applies without having to check for $\Delta P$<Reserve Solar, because solar output needs to be reduced. The reduction in solar output can be achieved as an absolute reduction or using the solar plant to charge the battery while effectively reducing the solar plant contribution to grid.

If $\Delta P$>Reserve Solar while $\Delta P$>0, the solar plant reserve is insufficient. In such a case, the optimum $\Delta P$ is infeasible. In this case $\Delta P$ should be recomputed from the first step to a smaller value because the original value is infeasible with available resources due to constraints.

In combination with the above, or in a variant, $\Delta P$ is at least partly compensated by power from one or more BESS, $P_{batteryadj}$:

$$P_{plant}=P_{hydroAdj}+P_{solar}+P_{batteryadj}+P_{wind}$$

$$\text{Or: } P_{plant}=P_{hydroAdj}+P_{solarAdj}+P_{batteryadj}+P_{wind}$$

In combination with the above, or in a variant, $\Delta P$ is at least partly compensated by power from one or more wind turbines $P_{windadj}$:

$$P_{plant}=P_{hydroAdj}+P_{solar}+P_{battery}+P_{windadj}$$

$$\text{Or: } P_{plant}=P_{hydroAdj}+P_{solarAdj}+P_{batteryadj}+P_{wind}$$

In a more general case $\Delta P$ is compensated by power from at least one solar plant, at least one BESS, and at least one wind turbine:

$$P_{plant}=P_{hydroAdj}+P_{solarAdj}+P_{batteryadj}+P_{windadj}$$

In all these cases, a process like the above described above can be performed:

in a first step, an optimal $\Delta P$ is obtained by determining $\Delta P=P_{hydro}-P_{hydroAdj}$ based on the hydro plant efficiency curve, such that $\eta_{hydroAdj}>\eta_{hydro}$. $\Delta P$ will be compensated by a corresponding power adjustment from one or more other power source ($P_{solaradj}$. and/or $P_{batteryadj}$ and/or $P_{windadj}$).

in a second step a possible available reserve (or available energy or power is calculated from the data concerning the available energy or power of all the other sources.

in a third step, if $\Delta P$ is positive, it is verified if $\Delta P$<available reserve.

If $\Delta P$ is negative, the same approach applies, without having to check for $\Delta P$<available reserve, because the power output needs to be reduced. The reduction in power output can be achieved as an absolute reduction or using the different sources to charge the battery while effectively reducing their contribution to grid.

If $\Delta P$>available reserve while $\Delta P$>0, the available reserve is insufficient. In such a case, the optimum $\Delta P$ is infeasible. In this case $\Delta P$ should be recomputed from the first step to a smaller value because the original value is infeasible with available resources due to constraints.

The above method enables a hybrid plant operation at power levels that would otherwise fall in forbidden zones of hydro plants and enables a hydro plant operation at more optimal operating area (for instance better efficiency) when solar and/or battery and/or wind power is available. It is preferred to operate the hydro units at more optimal operating area, since operation in forbidden zones can contribute for instance to cavitation, vibration, instability and have an impact on the lifetime of the hydro units. The area(s) outside of forbidden zones can have several possible operating points, of which few may have better efficiency and/or lower impact on turbine life than the other points. These few points are optimal area (and are preferred operating points). Indeed, by avoiding these forbidden zones and allowing the hydro unit(s) to be operated in a more optimal operating area, the lifetime of the hydro unit is improved.

Figure 8:
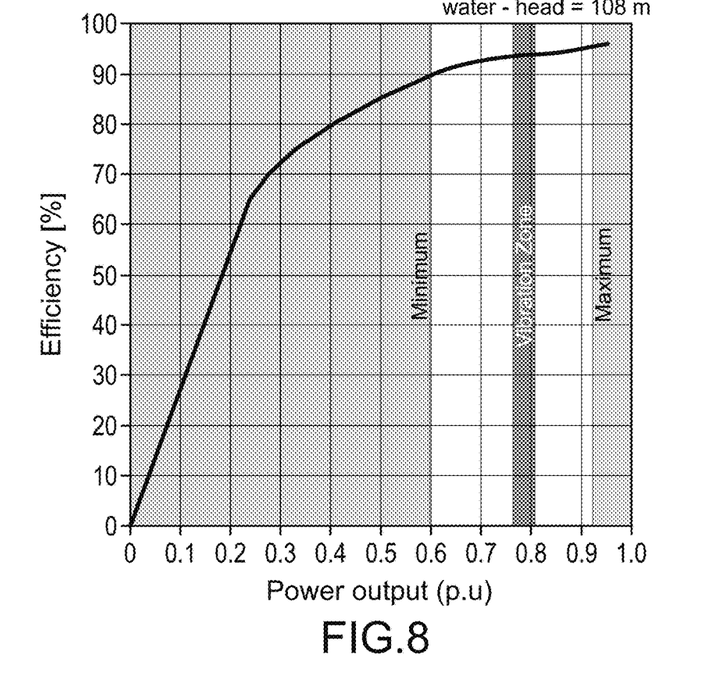
FIG. 8 illustrates the forbidden zone of operation for a hydro plant

FIG. 8 shows the power-efficiency curve of a hydro unit, which includes a forbidden zone in which instability can occur. The shape of the curve on this figure is different from the shape of the curve of FIG. 7 because the efficiency curve changes with head. The method according to the invention, in particular as described above, allows an adaptation of the hydro plant output power level so that it is outside the forbidden zone. In other words:

the power produced by the hydro unit can be reduced or increased so that it operates outside said forbidden zone;

and the power produced by the solar plant and/or the BESS and/or the wind plant is correspondingly increased (if the power produced by the hydro unit is reduced) or reduced (if the power produced by the hydro unit is increased), so that the whole power produced by the hybrid plant stays constant or corresponds to the requirement of the grid.

The above example describes a single hydro plant, a single solar plant and possibly a battery and/or one or more wind turbine(s).

Figure 9:
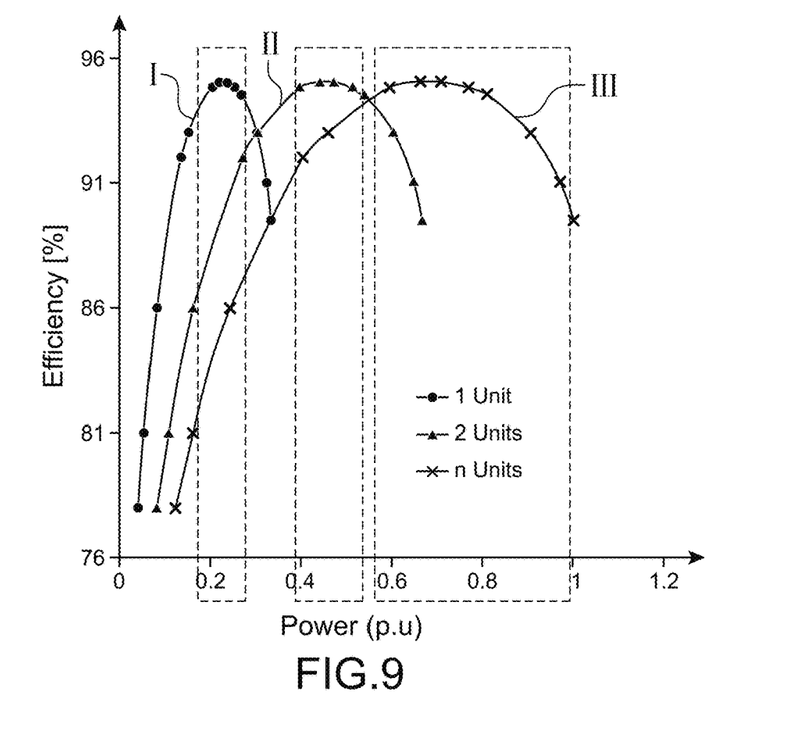
FIG. 9 shows several hydro efficiency curves for multiple units.

But the same approach can be extended to multiple hydro plants with one or multiple units or one hydro unit with several hydro units, multiple solar plants, multiple battery systems and a plurality of wind turbines. FIG. 9 shows the hydro efficiency curves for one hydro plant (curve I), for two hydro plants (curve II) and for three hydro plants (curve III); for each of these curves, a window or a rectangle indicates the preferred zone of operating point adjustment for the hydro unit(s) to achieve improved hybrid plant efficiency.

The following equations model the extension of the operational point adjustment described above to multiple units:

$$P_{plant} = \Sigma_{i=1\ldots n} P_{hydro(i)} + \Sigma_{j=1\ldots m} P_{solar(j)} + \Sigma_{k=1\ldots p} P_{BESS(k)} + \Sigma_{k=1\ldots q} P_{wind(k)}$$

$$P_{hydroAdj(i)} = P_{hydro(i)} - \Delta P_{(i)}, \text{ for } i=1\ldots n$$

$$P_{solarAdj(j)} = P_{solar(j)} + \Sigma_{i=1\ldots n} \Delta P_i, \text{ for } j=1\ldots m$$

$$P_{plant} = \Sigma_{i=1\ldots n} P_{hydroAdj(i)} + \Sigma_{j=1\ldots m} P_{solarAdj(j)} + \Sigma_{k=1\ldots p} P_{BESS(k)} + \Sigma_{k=1\ldots q} P_{wind(k)}.$$

The process flow to obtain the optimal ΔP can be as follows:

Step 1: Select the appropriate window or rectangle for variations of ΔP;

Step 2: Determine $\Delta P = \Sigma_{i=1\ldots n} \Delta P_i$ from the hydro unit efficiency curve such that $\eta_{hydroAdj} > \eta_{hydro}$;

Step 3: Compute Reserve Solar from Solar irradiation data and $P_{solar}$;

Step 4: if ΔP is positive, it is verified if ΔP<Reserve Solar.

If ΔP is negative, the same approach applies without having to check for ΔP<available reserve, because the power output needs to be reduced. The reduction in power output can be achieved as an absolute reduction or using the different sources to charge the battery while effectively reducing their contribution to grid.

If ΔP>available reserve while ΔP>0, the available reserve is insufficient. In such a case, the optimum ΔP is infeasible. In this case ΔP should be recomputed from the first step to a smaller value because the original value is infeasible with available resources due to constraints.

Step 5: Preferably, it is verified for every $\Delta P_i$ that no hydro plant changes status from shutdown to start-up or vice versa. If the status of a hydro is changed its status, from shutdown to start-up or vice versa, ΔP is recalculated or recomputed so as to arrive at a feasible situation in which no hydro plant changes status. Indeed, it takes time to change the status of a hydro plant, which is a slow system; furthermore, such a change wastes water. In other words, small changes within a same power range are preferred.

As ΔP is determined, an equivalent adjustment of the solar operating point of each solar unit j is made by the control system 101 to move from $P_{solar(j)}$ to $P_{solarAdj(j)}$. For example, if the output power produced by the hydro plant(s) decreases, the output power produced by the solar plant is correspondingly increased. Here again, this adjustment makes use of the reserve solar explained above (FIG. 6).

In the above example, the control system 101 makes use of at least the hydro limits (generator minimum and maximum limits and/or pump minimum and maximum limits) and the solar irradiation data. One or more of the other above mentioned parameters can be used to arrive at a feasible set-point. Some of the above examples consider the adjustment in power to be balanced between the solar plant(s) and the hydro plant(s) only. Again, it is similarly possible to enable the battery storage system(s) and/or the wind turbines to participate in the power adjustment to enable an improvement of the hybrid plant efficiency: the power output from the BESS and/or the wind turbines can be increased or decreased depending on the needs to adjust for example the power output of the hydro plant(s).

The plant control system 101 can be programmed to implement the above processes or the above steps or the above equations, based on the data of the curves of FIGS. 6 and 7 (and/or FIG. 8 and/or FIG. 9) and the data from the grid interface 150.

Another novel control method of a hybrid plant according to the invention is presented to increase the real (or active) power production. This novel method enables increasing the real power production by managing the reactive power across the different assets of the hybrid plant. This reactive power management controls the different assets of the hybrid plant so as to meet the grid requirement in terms of reactive power and to increase the total real power production from the hybrid plant.

Reactive power dispatch allows for the reactive power produced by the hybrid plant to be maintained according to the requirements of the grid via coordinated reactive power control from both solar and hydro plants; this results in improved real power output from the hydro plant and adds to the net energy produced from the hybrid plant.

This can help to reduce voltage instabilities, in particular for large hydro plants, such instabilities being due to limitation in reactive power capabilities.

FIG. 10 and FIG. 11 show the apparent power capability curves for the solar plant and the hydro plant respectively. The reactive power from the solar plant(s) is generated by the solar inverter (the apparent power curve of FIG. 10 is for the solar inverter). The real power flows from the solar panel through the inverter while the reactive power is from the inverter itself obtained by controlling the power electronic switches of the inverter. As to the hydro plant, it is capable of providing reactive power support at different real power generation levels as shown on FIG. 11.

Such curves, or data of points of these curves, or data representing at least part of these curves, are stored in a memory of the integrated plant control means or system 101 or provided to said integrated plant control means or system 101.

Each area within the circle or the curve represents a feasible region of operation. The space outside of each apparent power curve/circle is a non-feasible region of operation.

In FIG. 10, points B1 and B2 lie within the apparent power circle and are feasible points of operation of the solar plant while point B3 lies outside the apparent power circle and is in a non-feasible region of operation of the solar plant.

Similarly, in FIG. 11, points A1 and A2 lie within the apparent power curve and are feasible points of operation of the hydro plant while point A3 lies outside the apparent power curve and is in a non-feasible region of operation of the hydro plant.

For any point like A1, A2, A3, B1, B2, B3 etc. there is a corresponding active power (or real power) component and a reactive power component.

The real, or active, power component is determined by factors like the available irradiation for the solar plant or the available water level in reservoir for the hydro plant.

The reactive power component is typically determined based on grid requirement.

A method of controlling a hybrid plant according to the invention to increase real power production may comprise the following steps:

Step 1: Assess reactive power requirement of hybrid plant based on information from grid interface 150. The reactive power requirement is usually computed based on a combination of data received from grid like voltage at the POI or power factor requirement and real power generation. It can also be directly received from grid.

Step 2: the solar plant capability to provide a portion of the plant reactive power requirement is evaluated; this step can be performed by the plant control system 101.

Step 3: the hydro units that can generate more real power at lower than expected reactive power i.e., which can shift operation from A1 to A2 (FIG. 9), are selected (by means or system 101);

Step 4: The reduction in reactive power between A1 and A2 is compensated by the solar plant through an increase in reactive power by shifting operation from B1 to B2 (FIG. 10);

The hybrid plant level reactive power is maintained at a constant level, for example reactive power component of A1 and B1 is the same as reactive power component of A2 and B2.

The following equations show the relationship between the active (or real) power and reactive power components before and after the reactive power management process described in the above steps:

(1) Active power component of A2>Active power component of A1;
(2) Reactive power component of A2<Reactive power component of A1;
(3) Active power component of B2=Active power component of B1;
(4) Reactive power component of B2>Reactive power component of B1
(5) Active power component of A2+Active power component of B2>Active power component of A1+Active power component of B1
(6) Reactive power component of A2+Reactive power component of B2=Reactive power component of A1+Reactive power component of B1

It can be observed from the above set of equations that the net real power of the hybrid plant can be increased by using the reactive power management process according to the invention while continuing to meet the reactive power requirement of the grid.

This process can also enable conversion of a non-feasible point like, A3 or B3 to a feasible operating point which would lie within the apparent power capability curves through a similar reactive power management strategy (for example: reducing the reactive power produced by the hydro units and increase the reactive power produced by the solar inverter). Thus this process expands the operating range of the entire plant.

The plant control system 101 can be programmed to implement the above processes or the above steps or the above equations, based on the data of the curves of FIGS. 9 and 10 and the data from the grid interface 150. In an example:

Point 'A1' (FIG. 11) corresponds to a real power generation of ~0.8 per-unit and a reactive power generation of ~0.45 per-unit;

If it is required to increase the hydro real power generation from A1 to point 'A2', i.e., from ~0.8 pu to ~1.0 pu, then the reactive power capability of the hydro generator is limited by the curve to ~0.1 pu, which is less than the earlier ~0.45 pu. This 0.1 pu capability may not be sufficient to meet the grid requirement of reactive power for maintaining voltage stability;

In such a case, as the hybrid plant has other sources like solar plant(s) and/or wind turbine(s), the reactive power requirement of grid can be supplied by the solar inverter and/or the wind turbine based on their respective apparent power capability curves (as explained above, FIG. 10 is a representation of the solar apparent power capability curve). In the above example, as hydro power increases to 1.0 pu, the reactive power from hydro is ~0.1 pu and hybrid control means 101 will select set-points such that the remaining reactive power required by the grid will be supplied by the combination of solar, battery, wind etc.

Although the above process indicates a reactive power management between solar and hydro systems, the same can be extended to generator and/or inverter-based resources like solar, and/or hydro and/or wind turbines and/or battery systems. For a battery, reactive support can be generated by the inverter of the battery (through power electronic switching).

Another novel control method of a hybrid plant according to the invention is presented to manage a grid disturbance.

Figure 12A:
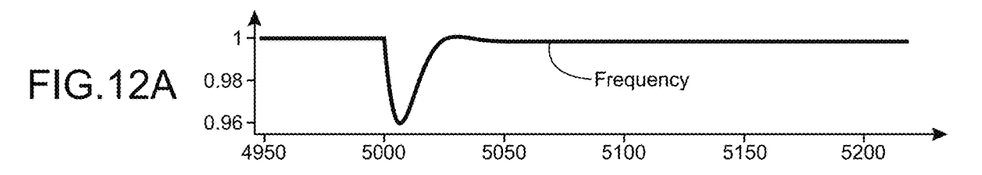
Figure 13A:
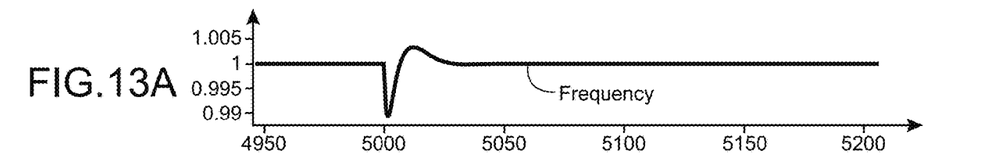
Figure 14A:
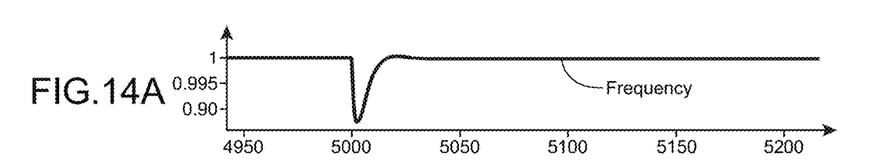
Figure 14B:
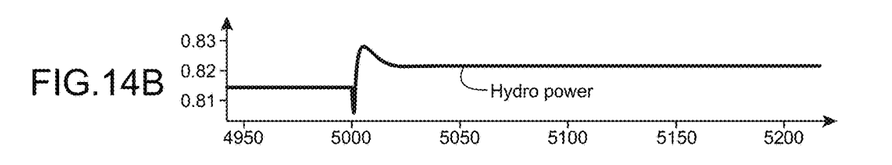

Examples of such situations are given on FIGS. 12A, 13A, 14A, each showing a relative drop in grid frequency, which changes from a nominal value due to a disturbance.

To restore the frequency back to nominal, the generators in the electrical grid including the hybrid plant increase their power output.

A disturbance like a load increase in the grid causes a decrease in frequency. In response, the hybrid plant increases its output power, thus contributing to restoring the frequency to its nominal value.

Only the hydro plant (FIGS. 12B-12D) or only the BESS (FIGS. 13B-13D) or both the hydro plant and the BESS (FIGS. 14B-14D) can be controlled by the control means 101 so that frequency is restored. When both the hydro plant and the BESS are controlled so as to provide a coordinated response, the hybrid controller 101 coordinates them to provide an improved grid response.

Figure 12B:
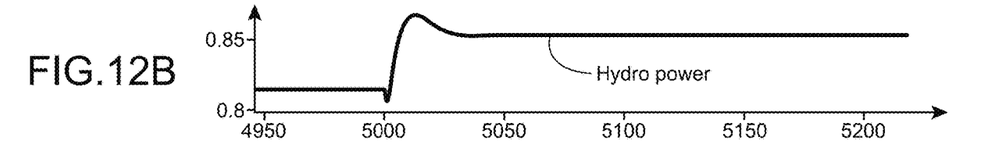
Figure 12C:
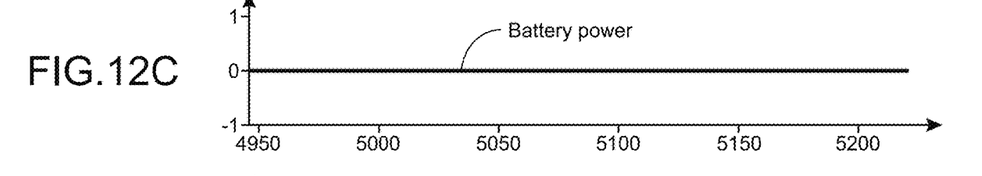
Figure 12D:
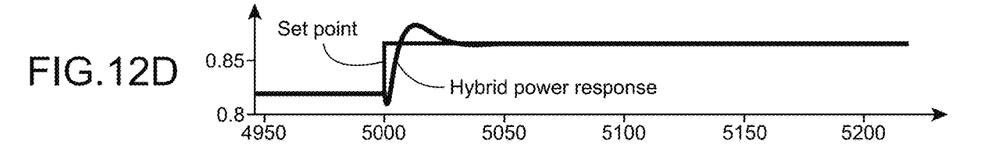

The frequency can be restored by only controlling the hydro plant by the control means 101: as can be seen from FIGS. 12B-12D, the hydro power produced by the hydro plant is increased (FIG. 12B), while the power from the BESS (FIG. 12C) is kept constant. Control means 101 set a set-point for the hydro plant so that it produces more power but the hydro plant has quite a long response time (FIG. 12D). The power produced by the hybrid plant increases, thus contributing to restoring the frequency to its nominal value, as can be seen on FIG. 12A.

Figure 13B:
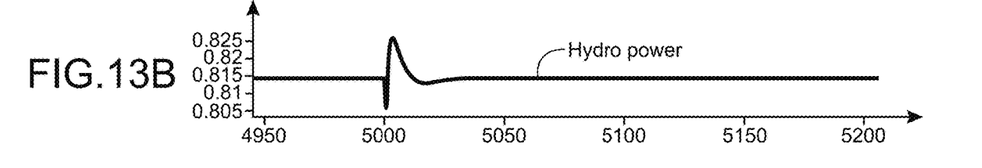
Figure 13C:
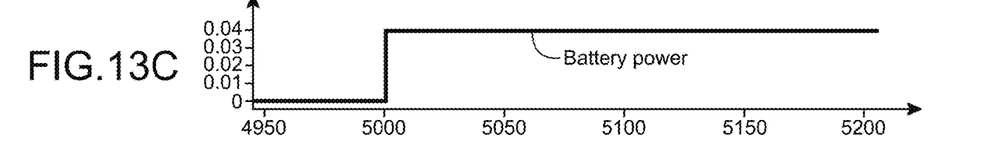
Figure 13D:
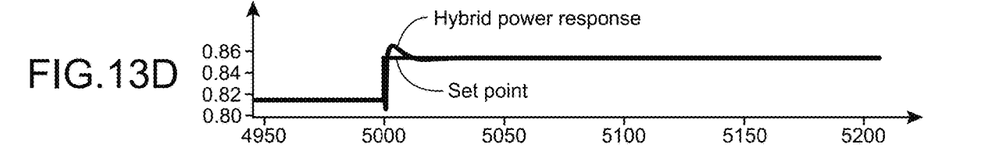

Alternatively the frequency can be restored by only controlling the BESS by the control means 101: as can be seen from FIGS. 13B-13D, the power produced by the BESS is increased (FIG. 13C), while the power from the hydro plant has a steady state behavior; on FIG. 13B, the hydro power varies for a short time, but the steady state value is the same as before the disturbance (about 0.815 in this example) and therefore the hydro power source has no contribution to the restoration of the frequency; The short time variation observed in this simulation can be avoided with a better control tuning. Control means 101 set a set-point for the BESS so that it produces more power with a small response time (FIG. 13C). The whole power produced by the hybrid plant increases (FIG. 13D), thus contributing to restoring the frequency to its nominal value, as can be seen on FIG. 13A.

Figure 14C:
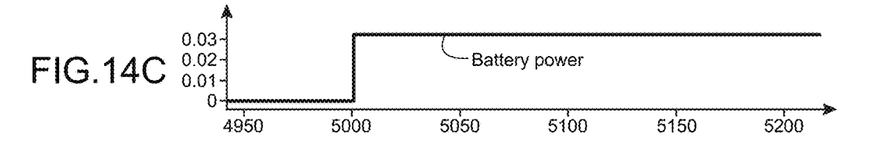
Figure 14D:
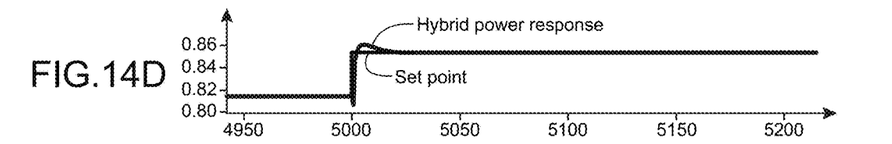

Alternatively the frequency can be restored by controlling both the hydro plant and the BESS by the control means 101: as can be seen from FIGS. 13B-13D, the hydro power produced by the hydro plant is increased (FIG. 14B) as well as the power from the BESS (FIG. 14C). Control means 101 set a set-point for each of the BESS and the hydro plant so that the hybrid plant produces more power with a small response time (FIG. 14D). The whole power produced by the hybrid plant increases (FIG. 14D), thus contributing to restoring the frequency to its nominal value, as can be seen on FIG. 14A.

With a combination of response from BESS and hydro plant, the following are observed:
- the frequency overshoot is lower compared to the battery only response (compare FIGS. 13A and 14A);
- the frequency settling time is lower with coordinated control compared to a control of either the BESS or the hydro plant (compare the restoration time on FIGS. 12A, 13A, and 14A);
- the load change is met faster with coordinated control compared to standalone response from either BESS or the hydro plant; in the three examples discussed above, the frequency disturbance (due to load change) starts at 5000 (see time axis) and restores back to nominal at 5033 for hydro only (see FIG. 12A), at 5025 for battery only (see FIG. 13A), at 5019 with a combined battery+ hydro response (see FIG. 14A). The time taken to restore the frequency back to its nominal value is a measure of speed of response to a load change. Since the combined battery and hydro case takes less time for the frequency restoration, it is the fastest of all three cases;
- the frequency nadir (the lowest point of frequency) is better (closer to nominal) with a coordinated hybrid response compared to hydro only response (0.99 per unit vs. 0.96 per unit). Hybrid control with the aid of the fast acting battery can limit the deviation in frequency. Battery being fast acting can allow for hydro response to be slower while ensuring hybrid plant to still respond fast to changes in grid without causing wear and tear of the hydro unit that could have occurred due to fast response;

This example shows a particular use of battery (with a step response) for coordinated response and the battery profile can be selected to be any desired form (like pulse, ramp etc; depending on the battery power and energy) to contribute to an improved grid response. It can be noted that a ramp is more gradual with respect to a pulse, so that frequency restoration implementing a ramp may be slow, but smoother than implementing a pulse, thus giving sufficient time for the hydro power units to gradually come to the new setpoint without wear and tear.

The above example shows coordinated control between the hydro plant and BESS. The same can be extended to a combination of BESS, hydro plant and solar plant. The response from the solar plant is just as fast as the battery. The battery can run out of charge or may have no ability for charge after a certain time. The limitations of the solar units are the MPPT on the one hand and the zero power on the other hand, but as long as the irradiation is available, solar power can further be generated; batteries have the disadvantage that huge battery size may not be economical: hence response with battery can be limited, whereas the contribution from the solar sources can be comparable to that from the hydro units.

The invention offers the following advantages:
- it allows for improved real power output from the hydro plant by operating at better efficiency and avoiding forbidden zones which impacts stability and life of hydro unit and adds to the net energy produced from the hybrid plant;
- it allows for the plant level reactive power requirement to be maintained via a combination of reactive power support from solar and/or hydro units and/or batteries and/or wind turbines;
- it allows for increased reactive power support from hybrid plant thereby preventing potential curtailment of solar and/or hydro and/or wind power due to non-compliance with grid reactive power requirement;
- for large hydro plants this can help reduce voltage instability due to limitation in reactive power capabilities.

The invention claimed is:

1. Method for controlling a hybrid power generation plant comprising a plurality of different power sources of different kinds from among a hydro plant comprising a dam and at least one hydroelectric unit, a solar plant, a wind turbine and a battery storage system, said method comprising:
   receiving from a grid to which the plant is connected at least one data from among a power demand, a peak hour, a frequency, a ramp, a reactive power, a voltage;
   varying a power production of at least one of the plurality of power sources, depending on said at least one data received from the grid and at least one characteristic of each of said plurality of power sources; and
   wherein the varying a power production comprises changing operation of the hybrid plant to increase an active power produced by the hybrid plant while maintaining reactive power at a constant level by increasing a real power of a first one of said plurality of power sources while decreasing a reactive power produced by the first one of said plurality of power sources and simultaneously increasing a reactive power produced by a second one of said plurality of power sources without increasing a real power produced by the second one of the plurality of power sources, the first one of said plurality of power sources being a different type of power source from the second one of said plurality of power sources.

2. Method according to claim 1, wherein the first one of the power sources is the hydro plant and the second one of the power sources is at least one of said solar plant, said wind turbine, or said battery storage system.

3. Method according to claim 1, comprising selecting the first and second ones of said plurality of power sources by comparing data of reactive power and active power of each of said plurality of power sources with data of apparent power capability curves of said power sources, and after the selection performing the steps of increasing the real power of the first one of said plurality of power sources while simultaneously decreasing the reactive power produced by the first one of said plurality of power sources and increasing the reactive power produced by the second one of said plurality of power sources without increasing the real power produced by the second one of the plurality of power sources.

4. Method according to claim 1, comprising detecting a frequency variation from an initial frequency of the grid and varying the power output of at least one of said plurality of power sources to restore said initial frequency.

5. Method according to claim 1, comprising producing power by at least the first power source and the second power source to meet a first power requirement from the grid during a first time slot and producing power by only said first power source to meet a second power requirement from the grid during a second time slot.

6. Method according to claim 5, wherein the first power source is the hydro plant and the second power source is at least one of the solar plant, the at least one wind turbine and the battery storage system.

7. Method according to claim 1, comprising producing power by at least one of said first or second power sources to meet one or more of:
 a ramp rate requirement from the grid;
 a peak hour power demand from the grid;
 a load demand from the grid in real time;
 a reactive power requirement;
 a power factor grid requirement;
 a voltage requirement from the grid;
 a frequency response.

8. Method according to claim 1, further comprising producing at least one data about a power or a time varying power generated by at least one of the power sources or a power demand or an energy price forecast.

9. Method according to claim 1, further comprising providing one or both of a grid interface with an updated power schedule and a forecast application with at least an actual power data.

10. Method according to claim 1, comprising at least one of:
 increasing or decreasing, the power produced by said hydro plant so that it is operated without cavitation or vibration;
 changing the power production of at least one among the solar plant, the wind turbine and the battery storage system as a function of time.

11. System for controlling a hybrid power generation plant comprising a plurality of different power sources of different kinds from among a hydro plant comprising a dam and at least one hydroelectric unit, a solar plant, at least one wind turbine and at least one battery storage system, said system comprising:
 a control unit in communication with a grid to which the hybrid power generation plant is connected to receive from the grid at least one data from among a power demand, a peak hour, a frequency, a ramp rate, a voltage, a power factor;
 the control unit configured to change a power production of at least one of the plurality of power sources depending on said at least one data received from the grid and at least one characteristic of each of said plurality of power sources to increase an active power produced by the hybrid plant while maintaining reactive power at a constant level by increasing a real power of a first one of said plurality of power sources while decreasing a reactive power produced by the first one of said plurality of power sources and simultaneously increasing a reactive power produced by a second one of said plurality of power sources without increasing a real power produced by the second one of the plurality of power sources, the first one of said plurality of power sources being a different type of power source from the second one of said plurality of power sources.

12. System according to claim 11, wherein the control unit comprises at least one of the following modules:
 a grid performance based control module;
 a coordinated control module;
 an optimized control module.

13. Hybrid power generation plant comprising: a plurality of different power sources of different kinds from among a hydro plant comprising a dam and at least one hydroelectric unit, a solar plant, one or more wind turbines and a battery storage system, and the system for controlling a hybrid power generation plant according to claim 11.

* * * * *